April 9, 1940.                J. J. POMERANZ                2,196,872
                             OPHTHALMIC MOUNTING
                             Filed Jan. 21, 1939
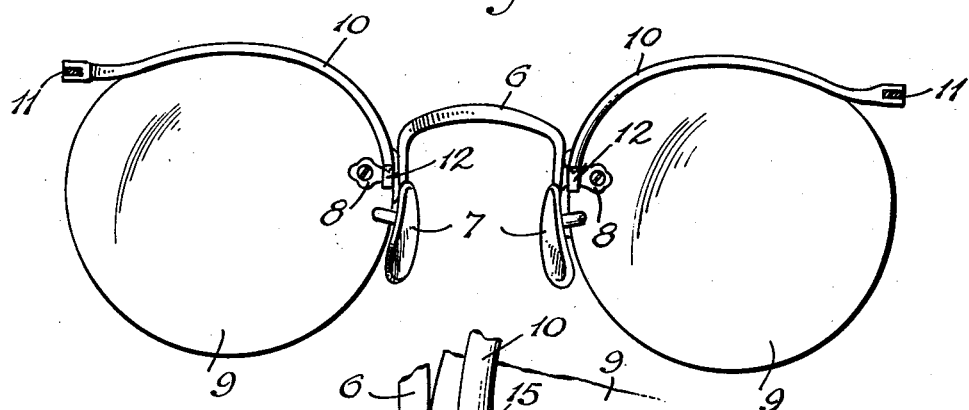
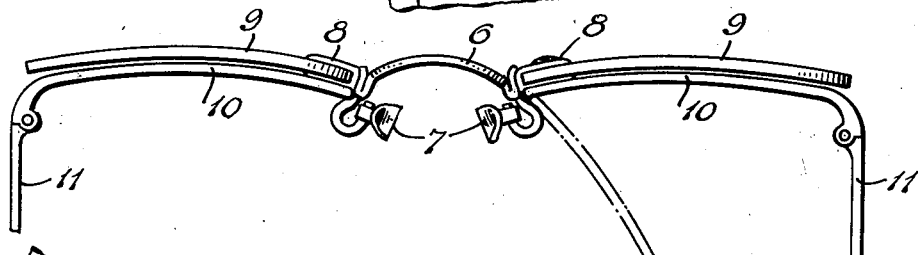
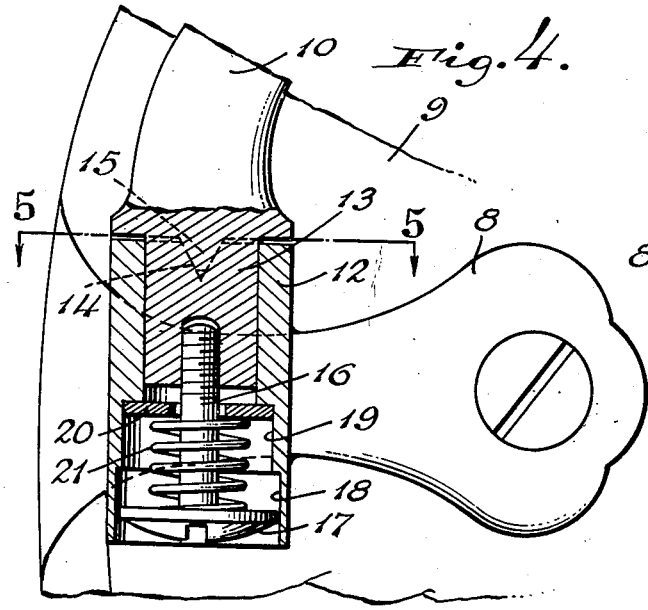
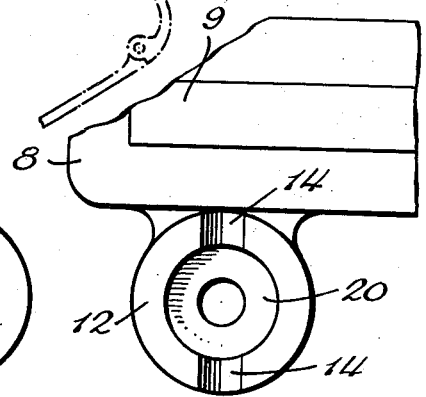
INVENTOR
JACOB J. POMERANZ
BY
Mueller + Ruhl
ATTORNEYS Patented Apr. 9, 1940

2,196,872

UNITED STATES PATENT OFFICE 2,196,872

OPHTHALMIC MOUNTING

Jacob J. Pomeranz, Brooklyn, N. Y.

Application January 21, 1939, Serial No. 252,059

3 Claims. (Cl. 88—47)

This invention relates to improvements in eyeglasses and has particular reference to a frame construction therefor.

Ophthalmic mountings are known in which the lens rim sections or arms forming parts of the frame are arranged in spaced relation to the lenses, either above the upper edges thereof or along their rear or inner surfaces contiguous to said edges. In such constructions, the frames have been of a rigid character and, particularly with the type in which each rim or arm extends along the rear of the lens, it has been found difficult to properly clean the latter in the space between the same and the adjacent rim section without encountering the danger of breaking the lens or straining some portion of the frame.

The present invention is designed to overcome the above difficulty by providing a mounting for each rim of the frame which will permit of said rim being removed from close proximity to its lens during the cleaning thereof, so that the entire surfaces of the lens and especially that portion of its surface to which the rim is normally adjacent, will be fully exposed and therefore easily reached with a cleansing cloth without undue strain upon the lens or the rim.

More specifically, the invention resides in the provision of a mounting for each lens rim of the frame in which a relative pivotal or swinging movement between the lens and its rim may be effected so that the same may be moved apart from their normal positions in close proximity to each other.

The inventive idea involved is capable of receiving a variety of mechanical expressions one of which, for purposes of illustration, is shown in the accompanying drawing; but it will be expressly understood that said drawing is used merely for the purpose of facilitating the description of the invention as a whole and not to define the limits thereof, reference being had to the appended claims for this purpose.

In the drawing:

Figure 1 is a rear elevation, partly in section, of an ophthalmic mounting constructed in accordance with the invention.

Figure 2 is an enlarged fragmentary view of the mounting for one of the lens rims, the parts of the mounting being adjusted to the position which will permit of a rotary or turning movement of said rim so that it may be swung away from its lens.

Figure 3 is a fragmentary top plan view of the ophthalmic mounting, the dotted lines indicating a position into which one of the lens rims may be moved so as to be spaced from its lens.

Figure 4 is an enlarged fragmentary vertical section through the mounting for one of the lens rims, and, Figure 5 is a section taken substantially on the line 5—5 of Figure 4.

In its preferred form, the ophthalmic mounting of the present invention is shown as comprising the bridge 6 which may have the usual nose pieces 7, and which is further provided on the opposite sides thereof with the laterally extending lens straps 8 utilized, in frames of this type, as the sole means for attaching the lenses 9 to the bridge.

The frame further comprises a pair of rim sections or arms 10, hereinafter generally referred to as rims, each associated with one of the lenses 9 and of a curvature conforming substantially to a portion of the edge of its lens. As shown, each rim is arranged in back of the lens 9, as best shown in Figure 3, and extends along the upper edge of said lens in close proximity thereto. It is also conceivable, however, that said rim may extend over the upper edge of the lens or in front thereof, without departing from the spirit or scope of the invention. At the outer extremity of each rim 10 the same may be moved rearwardly and has pivoted thereto, in the usual manner, the temple 11.

In accordance with the present invention, a mounting is provided for each rim which will permit of relative movement between the rim and its lens so that the two may be separated when it is desired to clean the lens, thereby to avoid any strain upon either element. Preferably, this mounting takes the form of a pivotal connection between the bridge 6 and rim 10 and involves means for yieldably maintaining the rim in a normal position slightly spaced from the lens so that the eyeglasses may be removed, folded and replaced without disturbing the normal relationship between the parts. To this end, there is soldered or otherwise formed upon the rear or inner portion of each of the lens straps 8, or at any adjacent point, a socket member generally indicated by the numeral 12 which is in the nature of an open-ended sleeve or tube. The upper end of this socket 12 is adapted to receive snugly a plug or head 13 forming an extension of the inner end of the rim 10 and, when so positioned, the rim is held in association with its lens by cooperating means that normally prevents any relative movement between said parts. This means may be in the form of a key and slot connection, in which the upper end of the socket 12 is provided with diametrically opposed, substantially V-shaped, slots 14 which are adapted to receive similarly formed keys 15 depending from the adjacent end of the rim 10 on opposite sides of the plug 13. When inter-engaged, this key and slot arrangement prevents turning of the rim 10 relative to its lens, but when said keys are withdrawn from their slots, as indicated in Figure 2, the rim 10 may be turned away from its lens about a vertical axis and the lower edges of the keys 15 will then rest upon the end of the socket 12 until the rim 10 is restored to its normal position.

Means are provided for yieldably maintaining the rim in said normal position so that the same will not be accidentally displaced. This means takes the form of a screw 16 threaded into the lower end of the plug 13 and having its head 17 recessed within a counterbore 18 formed in the lower end of the socket 12. In an intermediate counterbore 19, also formed in said socket, there is positioned a washer 20 against which one end of a coil expansible spring 21 abuts with the other end thereof engaging the head 17. The spring 21 thus acts to force the head 17 downwardly, with the result that the plug 13 is yieldably held within the upper end of the socket 12. However, when a slight upward pull is exerted upon the rim 10 to disengage the keys 15 from the slots 14, preparatory to turning the rim, the spring 21 will be contracted and, after the rim has been restored to its position contiguous to its lens, said spring will thereupon act to again draw the plug 13 into the socket with the keys in engagement with their slots.

What is claimed is:

1. In an ophthalmic mounting, a frame including a bridge and rim members extending therefrom and spaced from the associated lenses, lens straps to attach said lenses to said bridge, a mounting for the inner end of each rim member comprising a sleeve-like socket supported adjacent said bridge, a plug extending from the inner end of said rim member and into one end of said socket for relative turning and longitudinal movements between said elements, enabling said rim member to be swung away from the lens, and cooperating means on said rim member and socket for releasably maintaining said plug and socket against turning movement.

2. In an ophthalmic mounting, a frame including a bridge and rim members extending therefrom and spaced from the associated lenses, lens straps to attach said lenses to said bridge, a mounting for the inner end of each rim member comprising an open ended sleeve-like socket secured to each lens strap, a plug extending from the inner end of said rim member and into one end of the adjacent socket, cooperating means between said rim member and socket operable to prevent relative turning movements therebetween, a headed member extending from said plug and disposed within the confines of said socket, and a spring acting upon the head of said member to yieldably maintain said cooperating means effective.

3. In an ophthalmic mounting, a frame including a bridge and rim members extending therefrom and spaced from the associated lenses, lens straps to attach said lenses to said bridge, a socket member secured to each lens strap to the rear of the lens which it carries, means to mount each rim member in one of said sockets for relative turning and longitudinal movements between said elements, means to releasably prevent such turning movement, and yieldable means resisting said longitudinal movement.

JACOB J. POMERANZ.